Patented Sept. 10, 1929.

1,727,866

UNITED STATES PATENT OFFICE.

WALTER DIETERLE, OTTO MATTHIES, AND EMIL MAUERHOFF, OF DESSAU, AND JOSEF REITSTÖTTER, OF BERLIN-FRIEDENAU, GERMANY, ASSIGNORS, BY MESNE ASSIGNMENTS, TO AGFA ANSCO CORPORATION, OF BINGHAMTON, NEW YORK, A CORPORATION OF NEW YORK.

PHOTOGRAPHIC GELATINE AND PROCESS OF PREPARING THE SAME.

No Drawing. Application filed April 21, 1927, Serial No. 185,653, and in Germany May 14, 1926.

The present invention relates to a new gelatine and more particularly to a gelatine containing a degradation product of a protein which is especially suitable for preparing photographic silver salt emulsions and to a process of preparing the same.

In the co-pending specification Ser. No. 127,708, filed August 6, 1926, in the names of Otto Matthies, Walter Dieterle, Josef Reitstoetter and Emil Mauerhoff, a process is described for manufacturing photographic silver salt emulsions. According to the invention disclosed in said specification photographic emulsions of high sensitivity may be manufactured by adding in emulsion making, products of decomposition of vegetable or animal proteins prepared by alkaline or fermentative hydrolysis and a simultaneous partial oxidation. These products of hydrolysis, after having been neutralized, can be added directly in the diluted form as they are obtained, or the effective compounds contained therein may first be enriched or isolated. The products of decomposition may be prepared, e. g., from albumen, keratin, gelatine, cystine, animal hide, tendons, cartilages, horn, bone or other raw materials for glue and gelatine.

We have found that high grade photographic gelatine which yields especially highly sensitive silver salt emulsions can be produced by adding during the manufacture of the gelatine such a protein degradation product as is described in specification Ser. No. 127,708. Furthermore ordinary commercial gelatine which is not suitable for preparing photographic silver salt emulsions can be converted into an excellent photographic gelatine by re-melting it with water and thoroughly mixing it with an amount of the degradation products cited above. The gelatine solution thus treated may be worked up to silver salt emulsions directly or after first having been brought again into sheet or other form in the usual manner. Instead of remelting, the commercial gelatine may as well be subjected in sheet form to an after-treatment by bathing it in a solution of the said degradation products. After this bathing-treatment it may be dried or worked up to silver salt emulsions in wet state.

Quality and quantity of the degradation products to be added are regulated according to the qualities which the silver salt emulsions for the manufacture of which the gelatine is to be used are required to have.

The protein degradation products may be produced as illustrated in the following examples.

*Example 1.*

10 g. of horn-shavings are boiled with 50 ccm. of a 10 per cent solution of sodium hydroxide, during a rather long time, with supply of air. The filtered and neutralized solution is added to a gelatine.

*Example 2.*

300 g. of gelatine or 100 g. of calf stock are heated for some time in alkaline solution and the neutralized solution is added to the gelatine.

*Example 3.*

100 g. gelatine are hydrolyzed at 37° C. during some hours by pancreatin and the resulting solution is added to gelatine.

Having now particularly described and ascertained the nature of our said invention and in what manner the same is to be performed, we declare that what we claim is:

1. A gelatine containing a degradation product of a protein prepared by subjecting the protein to hydrolysis and simultaneous partial oxidation, being suitable for preparing photographic silver salt emulsions.

2. A gelatine containing a degradation product of a protein prepared by subjecting the protein to alkaline hydrolysis and simultaneous partial oxidation, being suitable for preparing photographic silver salt emulsions.

3. A gelatine containing a degradation product of a protein prepared by subjecting the protein to alkaline fermentative hydrolysis and simultaneous partial oxidation, being suitable for preparing photographic silver salt emulsions.

4. The process which comprises adding to an ordinary commercial gelatine a degradation product of a protein prepared by subjecting the protein to hydrolysis and simultaneous partial oxidation.

5. The process which comprises adding to an ordinary commercial gelatine a degradation product of a protein prepared by subjecting the protein to alkaline hydrolysis and simultaneous partial oxidation.

6. The process which comprises adding to an ordinary commercial gelatine a degradation product of a protein prepared by subjecting the protein to alkaline fermentative hydrolysis and simultaneous partial oxidation.

7. The process according to claim 4 in which dry gelatine is immersed in a solution of a degradation product of a protein prepared by subjecting the protein to hydrolysis and simultaneous partial oxidation.

8. The process according to claim 5 in which dry gelatine is immersed in a solution of a degradation product of a protein prepared by subjecting the protein to alkaline hydrolysis and simultaneous partial oxidation.

9. The process according to claim 6 in which dry gelatine is immersed in a solution of a degradation product of a protein prepared by subjecting a protein to alkaline fermentative hydrolysis and simultaneous partial oxidation.

In testimony whereof we affix our signatures.

WALTER DIETERLE.
OTTO MATTHIES.
EMIL MAUERHOFF.
JOSEF REITSTÖTTER.